Dec. 2, 1969 F. H. VAN WINSEN ET AL 3,481,622
SUSPENSION OF AN AUXILIARY FRAME AT THE MAIN FRAME
OF A VEHICLE, ESPECIALLY OF A MOTOR VEHICLE
Filed April 7, 1967 2 Sheets-Sheet 1

INVENTORS
FRIEDRICH H. VAN WINSEN
GÜNTHER HAVERBECK
BY
*Dicke + Craig*
ATTORNEYS United States Patent Office 3,481,622
Patented Dec. 2, 1969

3,481,622
SUSPENSION OF AN AUXILIARY FRAME AT THE MAIN FRAME OF A VEHICLE, ESPECIALLY OF A MOTOR VEHICLE
Friedrich H. van Winsen, Kirchheim, Teck, and Gunther Haverbeck, Plochingen, Germany, assignors to Daimler-Benz Aktiengesellschaft, Stuttgart - Unterturkheim, Germany
Filed Apr. 7, 1967, Ser. No. 629,310
Claims priority, application Germany, Apr. 16, 1966, D 49,873
Int. Cl. B60g 5/04, 7/00
U.S. Cl. 280—106.5
26 Claims

ABSTRACT OF THE DISCLOSURE

A suspension for an auxiliary frame at the main frame of a vehicle, especially motor vehicle, in which the driving engine may be elastically supported on the auxiliary frame and the wheel suspension may be pivotally connected to the auxiliary frame, which comprises two elastic hinge-like bearings supporting the auxiliary frame at the main frame, and two pull rods elastically supporting the auxiliary frame at the main frame, substantially exclusively in the longitudinal direction; the hinge-like bearings have bearing axes extending at least approximately in the vehicle transverse direction while the pull rods are connected to the main frame in elastic bearings. The construction of the hinge-like bearings may be realized by utilizing two elastic cushions vulcanized on bushings which are supported on a bolt, whereby the elastic cushions are inserted into an aperture provided in the main frame and may be under pre-stress. The elastic support of the pull rod at the main frame may also include two elastic cushions whereby one or the other of these cushions may be more yielding for purposes of achieving an absorption characteristic which is dissimilar in the two directions.

Background of the invention

The present invention relates to a suspension of an auxiliary frame at the main frame of a vehicle, especially of a motor vehicle, in which the auxiliary frame is supported by elastic means within a vehicle cross plane in two points at the main frame and is supported by additional means with respect to the main frame whereby the auxiliary frame, in its turn, accommodates the wheel suspension while the driving engine of the vehicle is supported on the auxiliary frame by elastic means.

The aforementioned suspensions are known in general under the designation of "driving stool." With the known prior art constructions, the support of the auxiliary frame at the main frame is realized essentially in the manner of a pot-shaped rubber bearing having an approximately vertical bearing axis. However, this auxiliary frame suspension which is advantageous as such from an assembly point of view, entails the disadvantage that it permitted lateral movements of the auxiliary frame. Hence, an additional lateral support of the auxiliary frame at the main frame was necessary heretofore.

Summary of the invention

The present invention aims at an improvement in this direction. It is to be achieved by the present invention that the auxiliary frame possesses an exact guidance about the vehicle longitudinal axis, the vehicle vertical axis and in the lateral direction. Additionally, it is intended to be achieved that the auxiliary frame can carry out spring movements with respect to the main frame in the vehicle longitudinal direction.

The underlying problems are solved by the present invention with the arangement of the aforementioned type in that for purposes of a hinge-like support of the auxiliary frame at the main frame, two essentially cylindrical rubber bearings with at least approximately transversely disposed axes are provided and that the auxiliary frame is supported at the main frame exclusively in the longitudinal direction by two tie rods or pull rods supported in rubber. If mention is made above of a hinge-like support, then such reference intends to bring out the fact that the cylindrical rubber bearings enable essentially only rotary movements. In contradistinction thereto, the cylindrical rubber bearings are to be as unyielding as possible with respect to all forces which extend in the direction of their bearing axes or perpendicularly thereto. Furthermore, it is contemplated thereby that the support by means of the pull-or tie-rods engages at the auxiliary frame as low as possible in order to make the support by means of the pull- or tie-rods engages at The auxiliary frame suspension of the present invention offers the advantage that lateral forces can now be transmitted from the main frame to the auxiliary frame. An additional lateral support of the auxiliary frame becomes superfluous. Furthermore, the auxiliary frame can no longer carry out any pivotal movements about the vehicle longitudinal axis. Also, movements in the vertical direction are no longer possible so that the engine stroke movements cannot be influenced. Critical resonances are avoided thereby with the vertical spring system of the entire vehicle. Finally, one attains the significant advantage by the present invention that, as a result of the soft longitudinal spring means of the auxiliary frame, the wheels are able to deflect in the longitudinal direction. Shocks on the wheels are absorbed thereby in an improved manner.

It is preferably contemplated by the present invention that the two cylindrical rubber bearings are disposed on the same vehicle cross axis which, at the same time, is their longitudinal bearing axis. Of course, it might be feasible from case to case to incline the rubber bearings slightly with respect to the aforementioned cross axis. It is possible in this manner to bring or adjust the direction of the hardest resistance determinative for the bearing to every desired direction relative to the vehicle.

Vehicles are known in the prior art with a main frame whose longitudinal bearers extend approximately U-shaped above the auxiliary frame. For such types of vehicles, the present invention proposes that the two rubber bearings are disposed essentially at the highest place in the extension of the raised-up longitudinal bearers above the auxiliary frame. With such types of vehicle, it is generally customary that the auxiliary frame, starting from a center part extending approximately parallelly to the road surface is extended upwardly at an inclination on both sides. With such an auxiliary frame, the present invention now proposes that the pull rods engage the auxiliary frame in proximity to the transition from the center portion into the upwardly directed portion thereof.

The construction of the rubber bearings as such can be left to the discretion of the person skilled in the art and may be of any conventional construction. However, the present invention prefers a solution according to which each rubber bearing consists of two rubber sleeves or bushings which are arranged mirror-image-like to one another within a bushing or sleeve formed by the longitudinal bearer on a bolt connected with the auxiliary frame and which are provided externally with flange parts that are adapted to be pressed against the bushing or sleeve by the parts of the auxiliary frame accommodating the bolt. One is thereby in a position to place the rubber bearings under pre-stress by pressure on the auxiliary frame parts, which pre-stress may be adjusted to any desired value. The flange parts may be already present beforehand on each part of the rubber bearing or they are produced by the aforementioned pre-stress.

Appropriately, the bolt is thereby rigidly connected on the vehicle outside with a pressure plate which, in turn, is connected with the upright end, open toward the bottom, of the auxiliary frame which may serve simultaneously as abutment for a spring leg. A spacer bushing is then arranged according to the present invention on the bolt, and the bolt is fastened on the vehicle inside in a counter plate which is secured on a small mount or base of the auxiliary frame. By the use of the construction and arrangement proposed in accordance with the present invention, the support of the auxiliary frame and the support of the spring leg and/or of other wheel guide parts is combined in an advantageous space-saving manner.

It is already known in the prior art to provide tubular parts at the auxiliary frame or possibly also at the main frame for the pivotal connection of the wheel guide elements. The present invention proposes in connection therewith that an arm for the pivotal connection of the pull or tie-rod is secured at the forward end of this tubular part provided in the auxiliary frame, which arm extends over the end of the forward guide member. This arm and the adjoining pull-rod or tie-rod extend appropriately essentially in the extension of the tubular part itself. It is thereby advantageous if the pull rod or tie-rod is secured with its forward end at the longitudinal bearer or at another part of the main frame by means of rubber cushions of any conventional construction. Of course, it is also within the scope of the present invention if either the arm at the tubular part or the pull rod or both have slight angular deviations with respect to the direction of the tubular part.

Accordingly, it is an object of the present invention to provide an auxiliary frame suspension of the aforementioned type which is simple in construction, yet eliminates the aforementioned shortcomings and drawbacks encountered with the prior art constructions.

It is another object of the present invention to provide a suspension for an auxiliary frame at the main frame of a vehicle which substantially precludes lateral movements of the auxiliary frame while at the same time obviating the need for additional lateral supports of the auxiliary frame.

A further object of the present invention resides in an elastic suspension for the auxiliary frame of a motor vehicle at the main frame thereof which results in more accurate guidance of the auxiliary frame about the vehicle longitudinal and vertical axes as well as in the lateral direction while at the same time permitting spring movements of the auxiliary frame with respect to the main frame in the vehicle longitudinal direction.

Still a further object of the present invention resides in a suspension of the auxiliary frame on the main frame of a vehicle, especially a motor vehicle, which permits transmission of lateral forces from the main frame to the auxiliary frame while at the same time improving the absorption of shocks acting on the wheels.

Another object of the present invention resides in a suspension for an auxiliary frame at the main frame of a motor vehicle which avoids critical resonances in the vertical spring system of the vehicle while at the same time substantially isolating any effects on the engine stroke movements.

These and further objects, features, and advantages of the present invention will become more obvious from the following description when taken in connection with the accompanying drawing, which shows, for purposes of illustration only, one embodiment in accordance with the present invention, and wherein:

FIGURE 3 is a cross-sectional view, illustrating the bearing support of the pull rod or tie-rod according to FIGURE 2.

Figure 1:
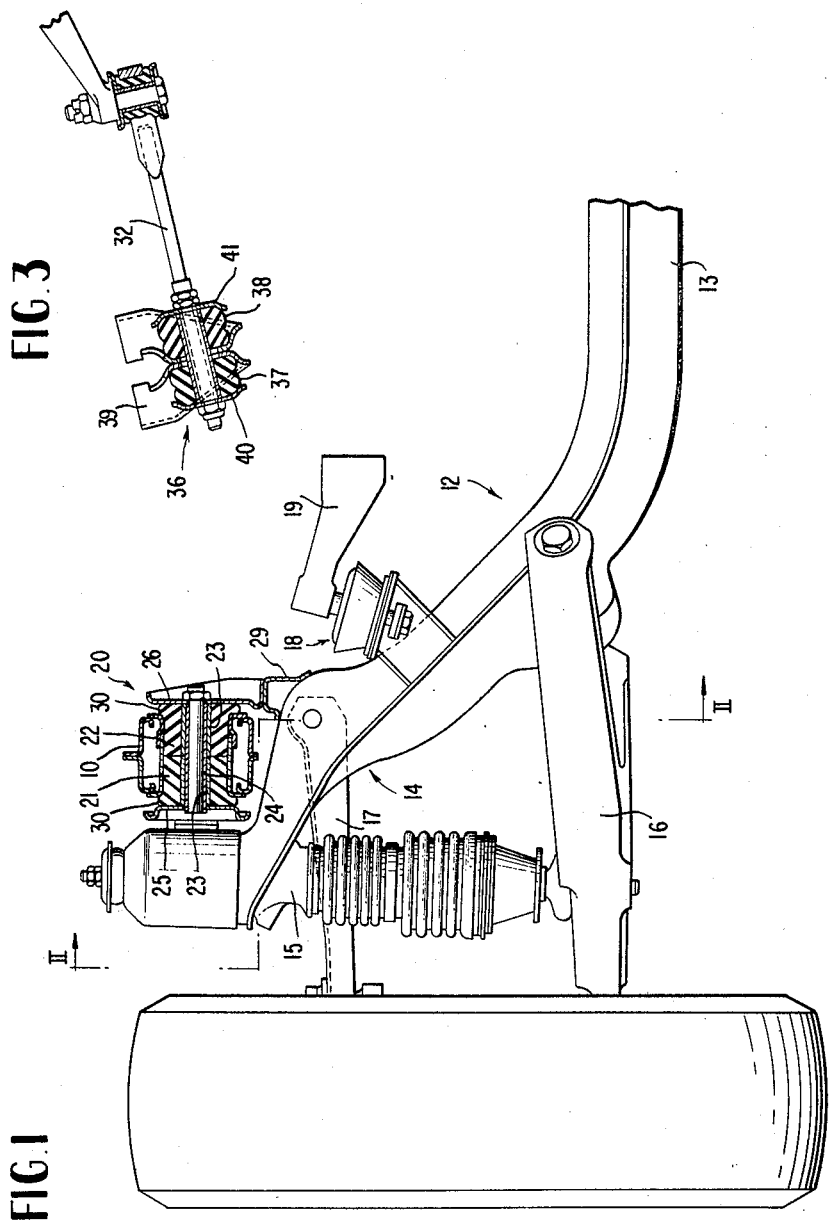
FIGURE 1 is a partial elevational view, partly in cross section, of an auxiliary frame suspension according to the present invention which is on one side of the vehicle, the other side being of mirror-image-like construction.
Figure 2:
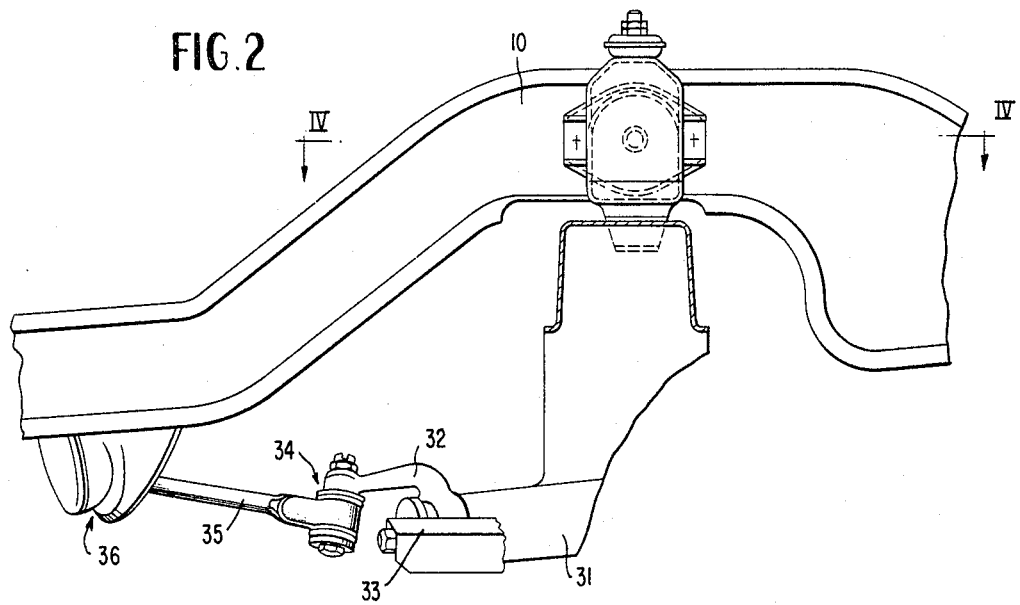
FIGURE 2 is a partial cross-sectional view, taken along line II—II of FIGURE 1.
Figure 4:
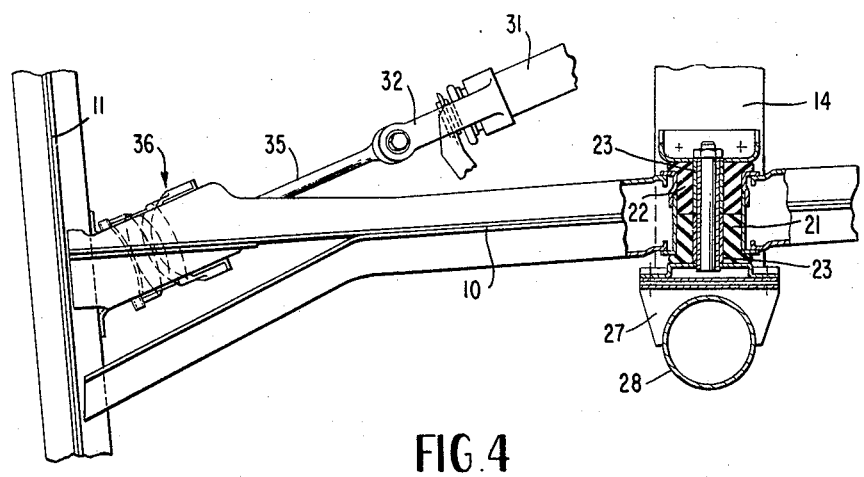
FIGURE 4 is a partial plan view, partly in cross section, of the auxiliary frame suspension of the present invention and taken along line IV—IV of FIGURE 2.

Referring now to the drawing wherein like reference numerals are used throughout the various views to designate like parts, and more particularly to FIGURES 1, 2, and 4, the main frame of the vehicle consists of longitudinal bearers 10 and of a forward cross bearer 11 which is not illustrated in detail and may be of any conventional construction. As may be seen particularly well from FIGURE 2, the longitudinal bearer 10 extends within the area of the wheel suspension above the auxiliary frame. For this purpose, the longitudinal bearer 10 is raised up approximately in U-shape. The auxiliary frame generally designated by reference numeral 12 includes a center portion 13 which is approximately parallel to the road surface. The end portions 14 of the auxiliary frame 12 are extended upwardly at an inclination and serve at the upper end thereof as bearing support for a spring leg 15. The guide members 16 and 17 for the wheel suspension, which may be of any conventional construction, are also pivotally connected to the end portions 14. However, it is to be understood that the wheel suspension and spring system may be realized in any other suitable known manner and as such forms no part of the present invention. Additionally, the driving engine (not shown) of the vehicle is supported on the auxiliary frame 12 by means of rubber bearings 18 and brackets 19. Also, this arrangement forms no part of the present invention and may be of any other known type.

Rubber bearings generally designated by reference numeral 20 are provided for the suspension of the auxiliary frame 12 at the longitudinal bearers 10. The rubber bearings 20 are located approximately at the highest place of the U-shaped raised portions of the longitudinal bearers 10. The axes of the bearings 20 extend in a vehicle transverse plane. The bearings themselves are constructed as cylindrical rubber bearings. The longitudinal bearer 10 is apertured for this purpose in a sleeve or bushing-like manner. Two rubber sleeve cushions or buffers 21 and 22 are inserted into this bushing in a mutually mirror-image-like manner. The two rubber sleeve cushions 21 and 22 are provided inwardly thereof with bushings 23 vulcanized thereto which are supported on a hollow bolt 24. This bolt 24 connects a pressure plate 25 with an abutment plate 26. The former is secured at the bolt 24 by welding or in a similar manner. The pressure plate 25 is additionally threadably connected—see in particular FIGURES 2 and 4—with a fork-shaped eye or lug 27 which, in its turn, is welded to the pot-shaped part 28 of the auxiliary frame portion 14. The pot-shaped part 28 serves—as already mentioned—as abutment for the spring leg 15. The abutment plate 26 is threadably secured on a small mount 29, which is welded to the auxiliary frame portion 14.

It can be readily seen and is obvious that the two bearings 20 are extraordinarily rigid in a force direction transversely to the bearing axis thereof. Consequently, the auxiliary frame cannot carry out a movement either in the vertical direction or a pivotal movement about the vehicle longitudinal axis. For purposes of suppressing lateral movements, the rubber blocks 21 and 22 are provided with flanges 30 which are compressed under corresponding pre-stress between the sleeve-shaped eye of the longitudinal bearer 10 and the pressure plate 25 and abutment plate 26. By the selection of the length of the bushings 23 one is therefore in a position to place these flange parts 30 under any desired pre-stress. The flange parts 30 need not be provided beforehand at the rubber blocks 21 and 22. It is also within the scope of the present invention to realize the same only by tightening of the two plates 25 and 26 against the longitudinal bearer 10. In any case, these flange parts render the bearings 20 extraordinarily rigid in the direction of their bearing axis. As a result thereof, this bearing support according to the present invention is capable of transmitting lateral forces from the longitudinal bearer 10 to the auxiliary frame 12 and vice versa.

At the place at which the auxiliary frame 12 passes over from its center portion 13 into the inclined, upwardly directed end portions 14, is located, as shown in particular in FIGURES 2 and 4, a tubular part 31 which forms the bearing support for the lower guide member of the wheel suspension. An arm 32 which extends over the end 33 of the forward guide member is located at the forward end of this tubular part 31. A pull-rod or tie-rod 35 engages at this arm 32 by means of a rubber bearing generally designated by reference numeral 34 which pull rod is secured with its forward end in a rubber bearing 36 at the longitudinal bearer 10 of the main frame. As can be readily seen from FIGURE 4, the arm 32 and the pull rod 35 are disposed in the extension of the tubular part 31. The auxiliary frame 12 is now additionally supported at the main frame by means of this pull-rod 35. The pull-rod 35 only absorbs longitudinal forces. Consequently, it can be constructed very simple from a structural point of view.

According to FIGURE 3, the bearing 36 of the pull rod 35 consists of two strong rubber cushions 37 and 38. The rubber cushions 37 and 38 are arranged on both sides of an eye 39 at the longitudinal bearer 10 and are placed by means of plates 40 and 41, which are arranged on the pull rod 35 itself, under pre-stress which may possibly be adjustable. The bearing 36 permits in this manner a movement of the pull rod 35 in the longitudinal direction of the vehicle.

As a result of this last-described longitudinal movability by means of the bearing 36 that angular range can be determined within which the auxiliary frame 12 can move in a hinge-like manner about its bearing 20. In this manner shocks and impacts on the wheel are absorbed in an improved manner. The shock or impact direction generally extends obliquely from below to above, i.e., in an inclined upward direction. It is decomposed by the suspension of the present invention into a vertical component and into a horizontal component whereby the latter is absorbed by the described pivotal movability of the auxiliary frame 12 about its bearing 20. It is thereby within the purview of the present invention if one shock or impact direction is preferred at the bearing 36 as for the most part, the shocks on the wheels occur from in front. This could be taken into consideration, for example, in that the forwardly disposed rubber cushion 37 is either essentially larger or considerably softer than the rubber cushion 38. In principle, a similar disposition may also be made at the bearing 34, however, normally one will dispense with such arrangement because this bearing is to establish exclusively a connection between the arm 32 and the pull rod 35 which has to be kept generally relatively rigid.

While we have shown and described one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A suspension for an auxiliary frame at the main frame of a vehicle, in particular of a motor vehicle, comprising main frame means, auxiliary frame means, and elastic support means for elastically supporting the auxiliary frame means at the main frame means to substantially preclude movements of the auxiliary frame means about the vehicle longitudinal and vertical axes and in the lateral directions, including bearing means having two essentially cylindrically shaped elastic means having at least approximately transversely disposed axes, and further bearing means including pull rod means supported in elastic bearings for elastically supporting said auxiliary frame means at said main frame means exclusively in the longitudinal direction.

2. A suspension for an auxiliary frame according to claim 1, wherein two such pull rod means are provided.

3. A suspension according to claim 1, wherein the auxiliary frame means is supported, for limiting motion about the vehicle vertical axis and in the lateral directions of the vehicle, at the main frame means in two points within a vehicle cross plane.

4. A suspension according to claim 1, wherein the axes of said cylindrically-shaped elastic bearing means are disposed to coincide with a common vehicle transverse axis.

5. A suspension according to claim 4, wherein said main frame means includes longitudinal bearers extending approximately in an inverted U-shaped manner above the auxiliary frame means, the two cylindrically shaped elastic bearing means being disposed substantially at the highest places in the extension of the raised longitudinal bearer means over the auxiliary frame means.

6. A suspension according to claim 5, wherein said auxiliary frame means includes a center portion extending approximately parallelly to the road surface and two end portions extending upwardly at an inclination on both sides from the center portion, the pull rod means of the further bearing means engaging at the auxiliary frame means in the region of the transition from the center portion to the upwardly extending portion.

7. A suspension according to claim 6, wherein each cylindrically shaped elastic bearing means includes two rubber-like sleeve means provided externally with flange portions and arranged mirror-image-like within a sleeve constituted by the longitudinal bearer of the main frame means, a hollow bolt means supporting thereon the two rubber-like sleeve means and connected to the auxiliary frame means, and the externally flanged portions being adapted to be pressed against the sleeve in the main frame means by the parts of the auxiliary frame means accommodating the hollow bolt means.

8. A suspension according to claim 7, wherein the bolt means is securely connected on the vehicle outside with a pressure plate which in its turn is connected with the upright end of the auxiliary frame means open toward the bottom and serving as abutment for a spring leg.

9. A suspension according to claim 8, further comprising two bushings arranged on the hollow bolt means and vulcanized to the rubber-like bushing means, the hollow bolt means being secured at the vehicle inside to an abutment plate, and said abutment plate being secured on a small mount of the auxiliary frame means.

10. A suspension according to claim 9, wherein said auxiliary frame means includes a tubular part for the pivotal connection of the lower wheel guide members, and further comprising an arm for the pivotal connection of the pull rod means secured to the forward end of the tubular part, the arm extending over the end of the forward guide member.

11. A suspension according to claim 10, wherein said arm and the adjoining pull rod means extend essentially in the extension of the tubular part.

12. A suspension according to claim 11, further comprising rubber-like cushion means for securing the pull rod means with the forward end thereof at the main frame means.

13. A suspension according to claim 12, wherein the forward end of the pull rod means is secured at the longitudinal bearer of the main frame means.

14. A suspension according to claim 1, wherein said main frame means includes longitudinal bearers extending approximately in an inverted U-shaped manner above the auxiliary frame means, the two cylindrically shaped elastic bearing means being disposed substantially at the highest places in the extension of the raised longitudinal bearer means over the auxiliary frame means.

15. A suspension according to claim 14, wherein said auxiliary frame means includes a center portion extending approximately parallel to the road surface and two end portions extending upwardly at an inclination on both sides from the center portion, the pull rod means of the further bearing means engaging at the auxiliary frame means in proximity of the transition from the center portion to the upwardly extending portions.

16. A suspension according to claim 14, wherein each cylindrically shaped elastic bearing means includes two rubber-like sleeve means provided externally with flange portions and arranged mirror-image-like within a sleeve constituted by the longitudinal bearer of the main frame means a hollow bolt means supporting thereon the two rubber-like sleeve means and connected to the auxiliary frame means, and the externally flanged portions being adapted to be pressed against the sleeve in the main frame means by the parts of the auxiliary frame means accommodating the hollow bolt means.

17. A suspension according to claim 16, wherein the bolt means is securely connected on the vehicle outside with a pressure plate which in its turn is connected with the upright end of the auxiliary frame means open toward the bottom and serving as abutment for a spring leg.

18. A suspension according to claim 17, further comprising two bushings arranged on the hollow bolt means and vulcanized to the rubber-like bushing means, the hollow bolt means being secured at the vehicle inside to an abutment plate, and said abutment plate being secured on a small mount of the auxiliary frame means.

19. A suspension according to claim 1, wherein said auxiliary frame means includes a tubular part for the pivotal connection of the lower wheel guide members, and further comprising an arm for the pivotal connection of the pull rod means secured to the forward end of the tubular part, the arm extending over the end of the forward guide member.

20. A suspension according to claim 19, wherein said arm and the adjoining pull rod means extend essentially in the extension of the tubular part.

21. A suspension according to claim 19, further comprising rubber-like cushion means for securing the pull rod means with the forward end thereof at the frame means.

22. A suspension according to claim 21, wherein the forward end of the pull rod means is secured at the longitudinal bearer of the main frame means.

23. A suspension according to claim 1, wherein said auxiliary frame means includes a center portion extending approximately parallelly to the road surface and two end portions extending upwardly at an inclination on both sides from the center portion, the pull rod means of the further bearing means engaging at the auxiliary frame means in proximity of the transition from the center portion to the upwardly extending portions.

24. A suspension according to claim 1, wherein each cylindrically shaped elastic bearing means includes two rubber-like sleeve means provided externally with flange portions and arranged mirror-image-like within a sleeve constituted by the longitudinal bearer of the main frame means, a hollow bolt means supporting thereon the two rubber-like sleeve means and connected to the auxiliary frame means, and the externally flanged portions being adapted to be pressed against the sleeve in the main frame means by the parts of the auxiliary frame means accommodating the hollow bolt means.

25. A suspension according to claim 24, wherein the bolt means is securely connected on the vehicle outside with a pressure plate which in its turn is connected with the upright end of the auxiliary frame means open toward the bottom and serving as abutment for a spring leg.

26. A suspension according to claim 25, further comprising two bushings arranged on the hollow bolt means and vulcanized to the rubber-like bushing means, the hollow bolt means being secured at the vehicle inside to an abutment plate being secured on a small mount of the auxiliary frame means.

References Cited

UNITED STATES PATENTS

| 3,119,628 | 1/1964 | Muller | 280—106.5 |
| 3,093,390 | 6/1963 | Muller | 280—106.5 |
| 3,093,391 | 6/1963 | Rothweiler | 280—106.5 |
| 2,888,269 | 5/1959 | Hogsten | 280—106.5 |
| 2,733,933 | 2/1956 | Kishline | 280—106 |

PHILIP GOODMAN, Primary Examiner

U.S. Cl. X.R.

280—124